(12) United States Patent
Kunkel et al.

(10) Patent No.: US 8,196,690 B2
(45) Date of Patent: Jun. 12, 2012

(54) INDUSTRIAL TRUCK, IN PARTICULAR A COUNTERWEIGHTED FORK LIFT TRUCK

(75) Inventors: Joachim Kunkel, Frammersbach (DE); Udo Herrmann, Johannesberg (DE); Arne Eckhoff, Aschaffenburg (DE)

(73) Assignee: Linde Material Handling GmbH, Aschaffenburg (DE)

( * ) Notice: Subject to any disclaimer, the term of this patent is extended or adjusted under 35 U.S.C. 154(b) by 530 days.

(21) Appl. No.: 12/499,818

(22) Filed: Jul. 9, 2009

(65) Prior Publication Data

US 2010/0018791 A1 Jan. 28, 2010

(30) Foreign Application Priority Data

Jul. 25, 2008 (DE) .......................... 10 2008 034 782

(51) Int. Cl.
*B60R 16/04* (2006.01)
*B60K 1/00* (2006.01)
(52) U.S. Cl. ...................................... 180/68.5; 180/65.1
(58) Field of Classification Search .................. 180/65.1, 180/68.5
See application file for complete search history.

(56) References Cited

U.S. PATENT DOCUMENTS 5,014,811 A * 5/1991 Valencic et al. .............. 180/286
5,520,258 A * 5/1996 Kemshall ..................... 180/68.5

FOREIGN PATENT DOCUMENTS

DE 103 46 550 A1 5/2005
DE 10 2005 007 584 A1 8/2006

* cited by examiner

*Primary Examiner* — J. Allen Shriver, II
*Assistant Examiner* — Bryan Evans
(74) *Attorney, Agent, or Firm* — The Webb Law Firm

(57) ABSTRACT

An industrial truck (1) has a compartment for an energy supply unit (5) having a lateral opening (6). A retaining apparatus (15) is provided for fixing the energy supply unit (5) in position in the lateral direction and a contacting apparatus (20) is provided for the electrical connection of the energy supply unit (5) with the industrial truck. The retaining apparatus (15) can pivot between a retaining position and a removal position, and a vehicle-side coupling element (20b) of the contacting apparatus (20) is located on the retaining apparatus (15). In the retaining position of the retaining apparatus (15), the vehicle-side coupling element (20b) is above the energy supply unit (5) and in the removal position the retaining apparatus (15) with the vehicle-side coupling element (20b) is outside the range of motion of the energy supply unit (5).

18 Claims, 6 Drawing Sheets

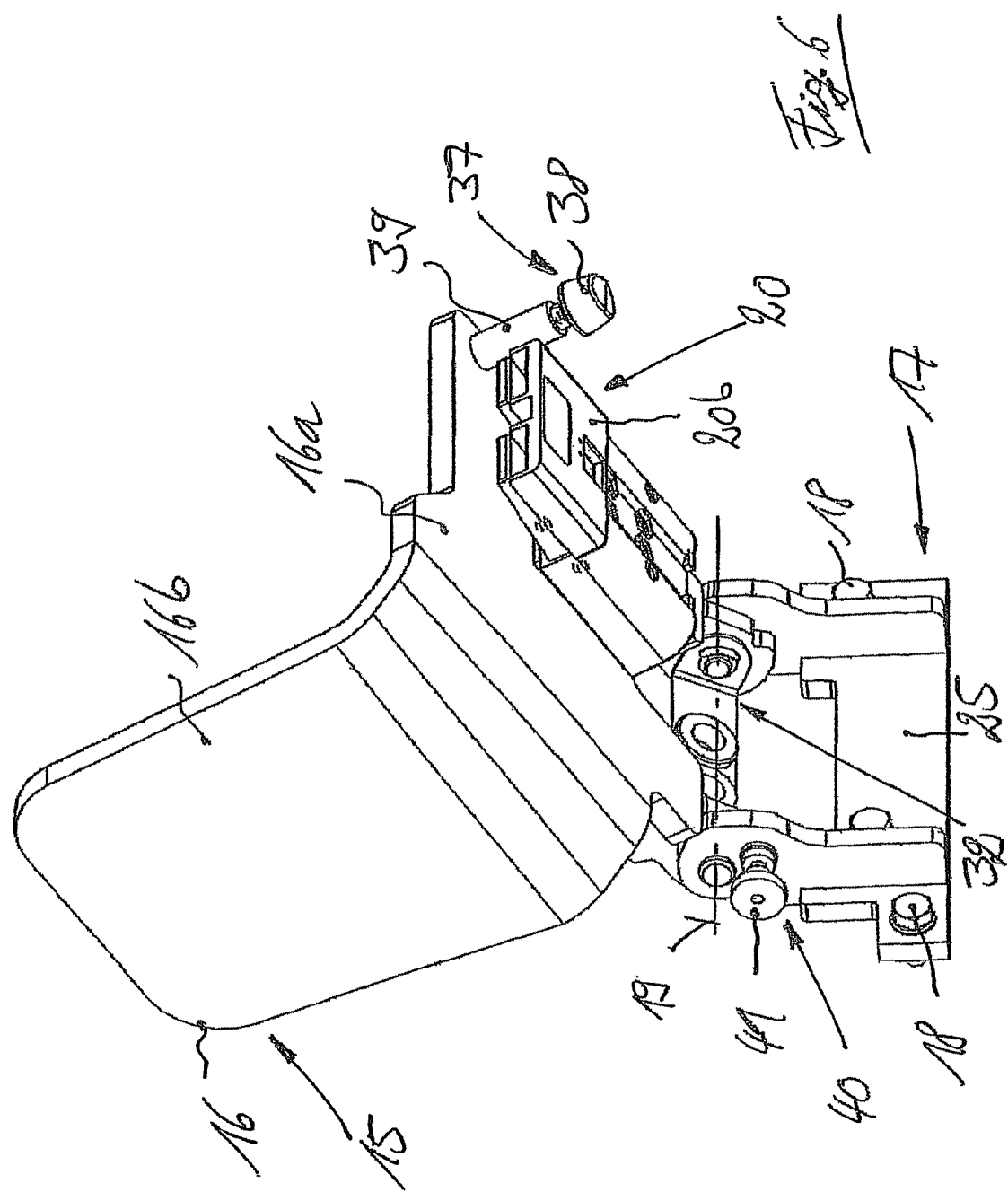

INDUSTRIAL TRUCK, IN PARTICULAR A COUNTERWEIGHTED FORK LIFT TRUCK

CROSS REFERENCE TO RELATED APPLICATION

This application claims priority to German Application DE 10 2008 034 782.5, filed Jul. 25, 2008, which is herein incorporated by reference in its entirety.

BACKGROUND OF THE INVENTION

1. Field of the Invention

This invention relates to an industrial truck, in particular a counterweighted fork lift truck, with a compartment for an energy supply unit. The compartment has a lateral opening for change or replacement of the energy supply unit. A retaining apparatus is provided for fixing the energy supply unit in position in the lateral direction. A contacting device is provided for the electrical connection of the energy supply unit with the industrial truck.

2. Technical Considerations

Electrically operated industrial trucks in the form of counterweighted fork lift trucks have a chassis with a compartment for an energy supply unit with a lateral opening for the change or replacement of the energy supply unit. This makes it possible to change or replace the energy supply unit in the horizontal direction through the lateral opening. For safety reasons, it is necessary to secure the energy supply unit in the lateral direction during operation of the industrial truck to prevent undesirable movements of the energy supply unit in the lateral direction and to prevent the energy supply unit from falling out of the industrial truck during operation or in accident situations.

DE 103 46 550 A1 describes a fork lift truck having a door that closes the lateral opening and simultaneously secures the energy supply unit in the lateral direction. A door of this type, however, requires a great deal of construction effort.

DE 10 2005 007 584 A1 describes a fork lift truck having a retaining apparatus located on the compartment of the energy supply unit that can be pivoted between a retaining position and a removal position. The retaining apparatus is located in the vicinity of a base plate of the compartment and interacts with the lower edge of the energy supply unit. A retaining apparatus of this type requires a high construction effort, however, and the pivoting of the retaining apparatus also requires the operator to be in a bent-over position.

For change or replacement of the energy supply unit, a hood that closes the compartment on top must generally be removed and the retaining apparatus must be actuated into a removal position. It is also necessary to disconnect a contacting apparatus for the electrical connection of the energy supply unit with the industrial truck and to remove a vehicle-side coupling element of the contacting apparatus, which can be located loosely on one end of the cable, for example, by moving or swinging the vehicle-side coupling element out of the way.

A number of time-consuming working steps are therefore necessary for the change or replacement of the energy supply unit. Mistakes can also be made during these operations. For example, after the insertion of an energy supply unit into the compartment, the contacting apparatus may be connected although the retaining apparatus is not pivoted into the retaining position. As a result of which, the energy supply unit can fall out during the operation of the industrial truck.

Therefore, it is an object of this invention to provide an industrial truck of the general type described above but in which a fast, easy and ergonomically efficient change or replacement of the energy supply unit is possible and in which the risk of operator error is also minimized.

SUMMARY OF THE INVENTION

The invention teaches that this object can be accomplished by locating the retaining apparatus on the industrial truck so that it can pivot between a retaining position and a removal position. A vehicle-side coupling element of the contacting apparatus is located on the retaining apparatus. In the retaining position of the retaining apparatus, the vehicle-side coupling element is above the energy supply unit and in the removal position for change or replacement of the energy supply unit, the retaining apparatus with the vehicle-side coupling element is located outside the range of motion of the energy supply unit.

The vehicle-side coupling element of the contacting apparatus can be located on the pivoting retaining apparatus, which prevents an unintentional movement of the energy supply unit in the lateral direction. The pivoting retaining apparatus is located above the energy supply unit. As a result of which, the contacting device which, in the retaining position is located above the energy supply unit, can be ergonomically easily and efficiently disconnected and connected, and the retaining apparatus can furthermore be actuated by the operator in an ergonomically efficient manner. By pivoting the retaining apparatus into the removal position, the retaining apparatus and the vehicle-side coupling element can simultaneously be pivoted outside the range of movement of the energy supply unit, so that only a single manual operation is necessary, which takes only a small amount of time, to pivot the retaining apparatus and the vehicle-side coupling element out of the range of movement of the energy supply unit. As a result of the combination of the retaining apparatus with the function of the contacting device, it is also easily possible to prevent operator error, since the coupling element on the energy supply side can be connected with the vehicle-side coupling element located on the retaining apparatus only when the retaining apparatus is in the retaining position.

In one aspect of the invention, the retaining apparatus is formed by a retaining plate which is bent at an angle and which has a bearing segment mounted so that it can pivot on a bearing housing, and has a vertical retaining segment which is oriented perpendicular or substantially perpendicular to the bearing segment. The vehicle-side coupling element is located on the bearing segment. A retaining plate of this type which is bent at an angle requires little construction effort and can easily be mounted so that it can pivot on a bearing housing. From a retaining plate of this type, it is easy to form a vertical retaining segment which interacts with the lateral surface of the energy supply unit that faces the opening, and a bearing segment oriented perpendicular to the latter is formed, to which the vehicle-side coupling element is fastened and with which the retaining apparatus is pivotably fastened to the bearing housing.

It is particularly advantageous if, as in one advantageous aspect of the invention, the bearing housing has two bearing components which are at some lateral distance from each other. The bearing segment of the retaining apparatus is provided with a flange plate in the vicinity of each bearing plate. A pivot bearing is provided between each bearing plate and the associated flange plate. With a pivot bearing of this type formed by two bearing components, on which the bearing segment is mounted pivotably with corresponding flange plates and bearing pins, for example, a compact bearing of the retaining apparatus can be achieved with little construction effort.

If, in one preferred development of the invention, at least one electrical connection cable that leads to the vehicle-side coupling element is located between the flange plates and/or the bearing components, the result is an advantageous and compact routing of the electrical connection cable axially between the bearing point of the retaining apparatus and, therefore, in the vicinity of the pivot bearing of the retaining apparatus. This arrangement also makes it possible to easily prevent kinking or damage to the electrical connection cable during the pivoting of the retaining apparatus.

The bearing segment of the retaining apparatus is advantageously provided with a recess between the flange plates. The electrical connection cables that lead to the vehicle-side coupling element through the pivot bearing are therefore guided in the vicinity of the recess to the coupling element, which is located on the retaining apparatus, and damage to the electrical cables can be effectively prevented.

It is particularly advantageous if a guide device for the electrical connection cables is located between the flange plates and/or the bearing components. As a result of which, the electrical connection cables which are guided between the flange plates and via the recess to the vehicle-side coupling element can be guided easily during the pivoting of the retaining apparatus.

In one aspect of the invention, the guide device is formed by a yoke located rotationally on the pivot bearings of the retaining apparatus, and which is provided with a cable holding device for the electrical connection cable. A yoke of this type which is rotationally mounted on the pivot bearings of the retaining apparatus and is provided with cable holding devices makes it possible with little construction effort to achieve a space-saving guidance of the electrical connection cables through the pivoting axis of the pivot bearing of the retaining apparatus.

In one development of the invention, at least one support is provided on the retaining apparatus, with which the retaining apparatus is supported in the retaining position. With a support of this type, a stop for the retaining position, and, thus, an interlocking of the retaining apparatus, can be achieved and high forces can be absorbed by the retaining apparatus in the retaining position.

In one aspect of the invention, the support is formed by a locking lug molded onto the flange plate. With a locking lug of this type, it is easily possible to provide support for the retaining apparatus on the industrial truck in the retaining position.

In one aspect of the invention, the retaining apparatus is provided with an interlock device for the removal position. With an interlock device of this type, an unintentional pivoting of the retaining apparatus back from the removal position into the retaining position during change or replacement of the energy supply unit can be effectively prevented.

The interlocking device is advantageously formed by a locking pin located on a bearing component of the bearing housing and which can be brought into a functional connection with a recess of the flange plate which is pivotably mounted on the bearing component. With a locking pin of this type, the retaining apparatus can easily be locked in the removal position and can be pivoted back into the retaining position by an actuation of the locking pin.

It is particularly advantageous if, in the retaining position, the retaining apparatus is located underneath a hood that covers the compartment of the energy supply unit, which hood is pivotably mounted on the industrial truck. Located on the retaining apparatus is a support element which, in the retaining position, is in a functional connection with the hood. A driver's seat is generally located on a pivotable hood of this type. By means of the support element, with which the retaining apparatus is supported on the hood, during operation of the industrial truck, an unintentional pivoting of the retaining apparatus into the removal position can be effectively prevented and, thus, the actuation of the retaining apparatus into the retaining position to secure the energy supply unit in the lateral direction can be ensured.

The support element is advantageously formed by a spring and/or damper element located on the bearing segment. A support of the retaining apparatus on the closed hood can be achieved in a simple manner, for example, with a spring and/or damper element, e.g., in the form of a rubber bumper.

It is particularly advantageous if the retaining apparatus, in particular by means of the retaining segment, prevents the hood from closing in the removal position. This measure can achieve a high level of safety against operator error and a high level of operating safety for the industrial truck because the hood that is provided with the driver's seat can be actuated into the closed position only when the retaining apparatus is in the retaining position in which the energy supply unit is secured in position.

If the pivoting movement of the retaining apparatus is coupled with the movement of the hood, it also becomes possible during the opening of the hood to simultaneously pivot the retaining apparatus from the retaining position into the removal position, and during the closing of the hood to pivot the retaining apparatus from the removal position into the retaining position, so that the operation is further simplified and accelerated, and operator errors can be easily prevented.

The retaining apparatus can be located in the vicinity of a counterweight or of a rearward transverse partition of the industrial truck that forms one boundary of the compartment of the energy supply unit. In one aspect of the invention, the retaining apparatus is located on a forward vertical transverse wall of the industrial truck that forms one boundary of the compartment. In this manner, when the hood is pivoted up, there is easy access to the retaining apparatus and advantageously ergonomic conditions for the connection and disconnection of the contacting apparatus and for the pivoting of the retaining apparatus.

If the bearing housing is detachably fastened to the forward transverse wall of the industrial truck, in particular by at least one threaded fastener, the retaining apparatus can easily be fastened to the industrial truck in the form of a pre-assembled unit.

As a result of the routing of the electrical connection cable through the pivoting axis of the pivot bearing of the retaining apparatus, the electrical connection cables that lead to the vehicle-side coupling element can be laid along the vertical transverse wall. Consequently, the connection cables can be routed in a space-saving manner on the vertical transverse wall without restricting the leg room of the operator.

BRIEF DESCRIPTION OF THE DRAWINGS

Additional advantages and details of the invention are described in greater detail with reference to the exemplary embodiment illustrated in the accompanying schematic drawings, in which:

FIG. 6 shows a retaining apparatus in the removal position in a perspective view.

DETAILED DESCRIPTION OF THE PREFERRED EMBODIMENTS

Figure 1:
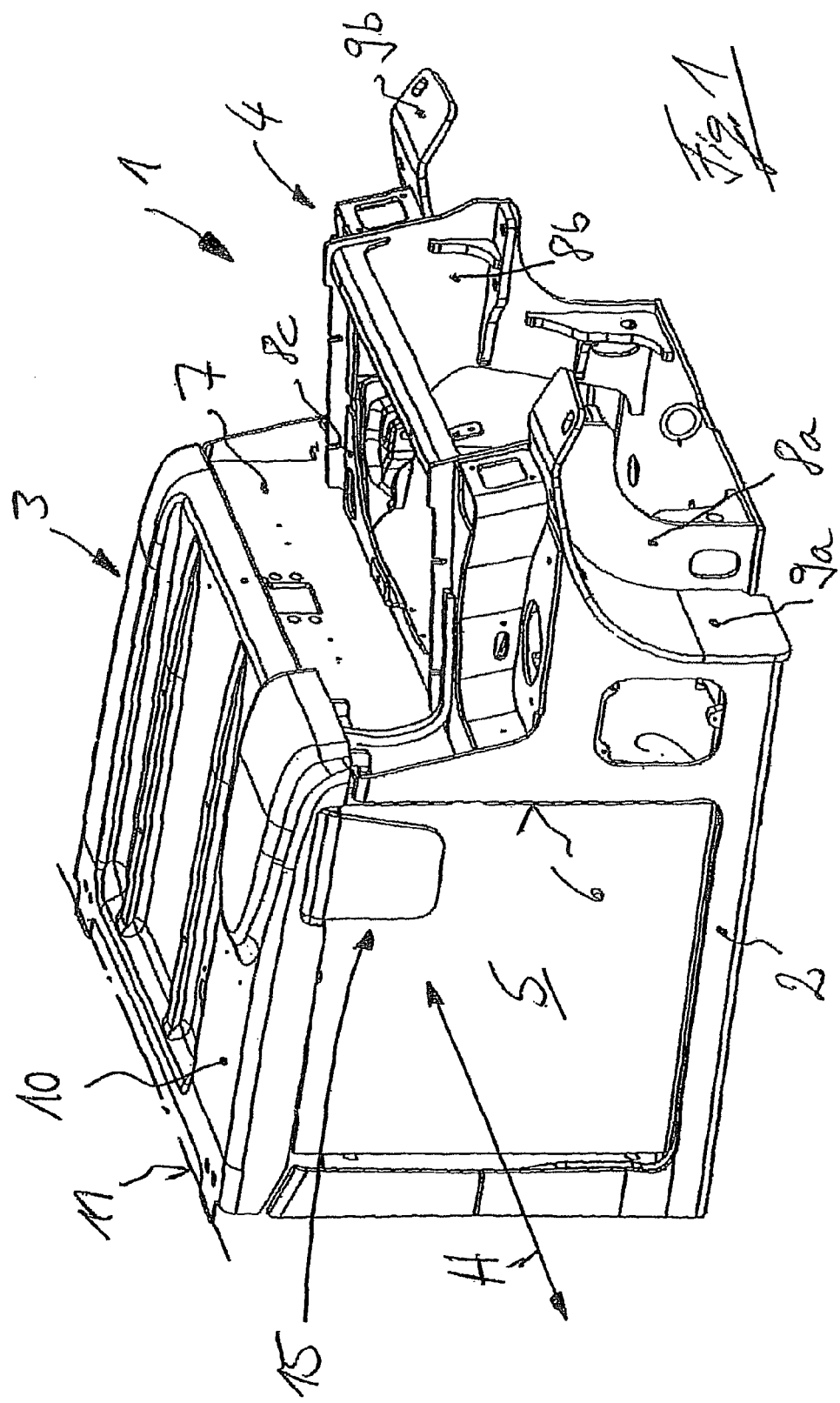
FIG. 1 shows an industrial truck of the invention in a perspective view.

FIG. 1 shows in a perspective view an industrial truck 1 of the invention in the form of a front-seat counterweighted fork lift truck. FIG. 1 shows a chassis 2 which forms a middle segment 3 and a forward segment 4 of the industrial truck 1. The middle segment 3 forms a compartment for an energy supply unit 5 and, on the front side in FIG. 1 and, thus, on the right side in the direction of travel, a lateral opening 6 for changing or replacing the energy supply unit 5 in a lateral and horizontal direction of removal H. The energy supply unit 5 can be, for example, a battery block, a fuel cell, or a hybrid drive unit with an internal combustion engine, a generator, and a battery, just to name a few.

Adjacent to a vertical transverse wall 7 of the chassis 2 that forms one boundary of the compartment for the energy supply unit toward the front, the forward segment 4 of the industrial truck has two vertical chassis fins 8a and 8b which are at some lateral distance from each other and an essentially horizontal chassis plate 8c which can be fastened to the base plate of a driver's workplace (which is not shown in any further detail). FIG. 1 also shows fenders 9a, 9b which are located on the forward end of the industrial truck, in which the drive wheels of the industrial truck, which are not illustrated in any further detail, are located.

The compartment for the energy supply unit 5 is closed on top by a hood 10, on which a seat (not shown in any further detail) for the operator can be located. The hood 10 is fastened in the rear segment to the industrial truck 1 so that it can pivot around a pivoting axis 11.

Located on the vertical transverse wall 7, in the upper area and the area facing the lateral opening 6, is a retaining apparatus 15 which, during the operation of the industrial truck, is located underneath the closed hood 10 and with which the energy supply unit 5 is held in the lateral direction and, thus, in the removal direction H and is fixed in position during the operation of the industrial truck.

Figure 2:
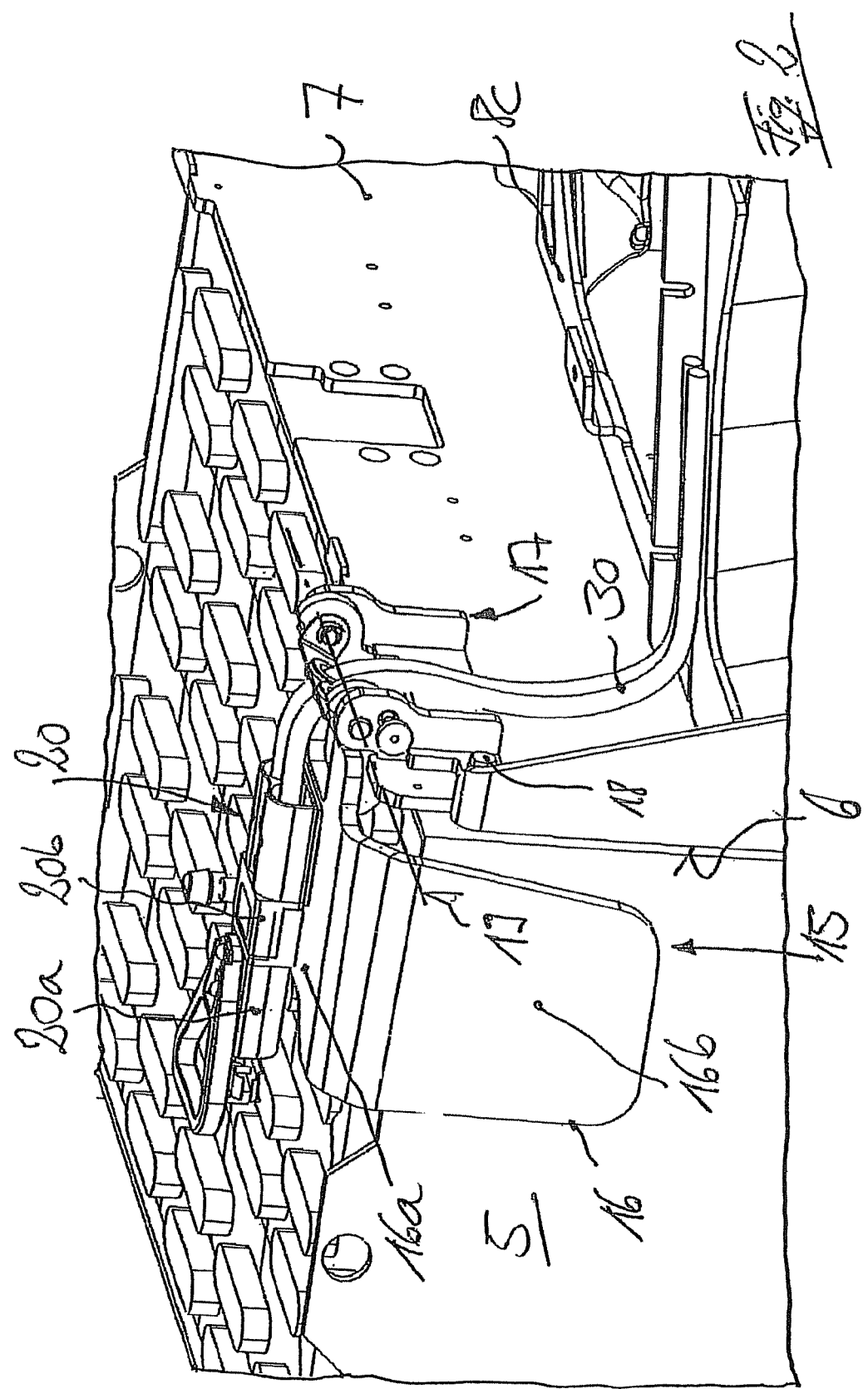
FIG. 2 shows a retaining apparatus of the invention in a perspective view.

The retaining apparatus 15 (as shown in FIG. 2) is formed by a retaining plate 16 which is bent at an angle and has a plate-shaped bearing segment 16a and a vertical, plate-shaped retaining segment 16b which is oriented perpendicular or substantially perpendicular to it which interacts with the side wall of the energy supply unit 5. The bearing segment 16a is mounted on a bearing housing 17 which is fastened to the vertical transverse wall 7 by means of threaded fasteners 18, so that it can pivot around a horizontal pivoting axis 19 which is oriented in the transverse direction of the industrial truck and, thus, parallel to the horizontal removal direction H of the energy supply unit 5.

For the connection of the energy supply unit 5 to the industrial truck 1, a contacting apparatus 20 formed by a battery plug is provided, which comprises an energy supply side coupling element 20a which is in communication with the energy supply unit 5 by means of connection cables (not shown in any further detail) and a vehicle-side coupling element 20b which is located on the upper side of the bearing segment 16a of the retaining apparatus 15. The contacting apparatus 20 is therefore located compactly above the energy supply unit 5.

Figure 3:
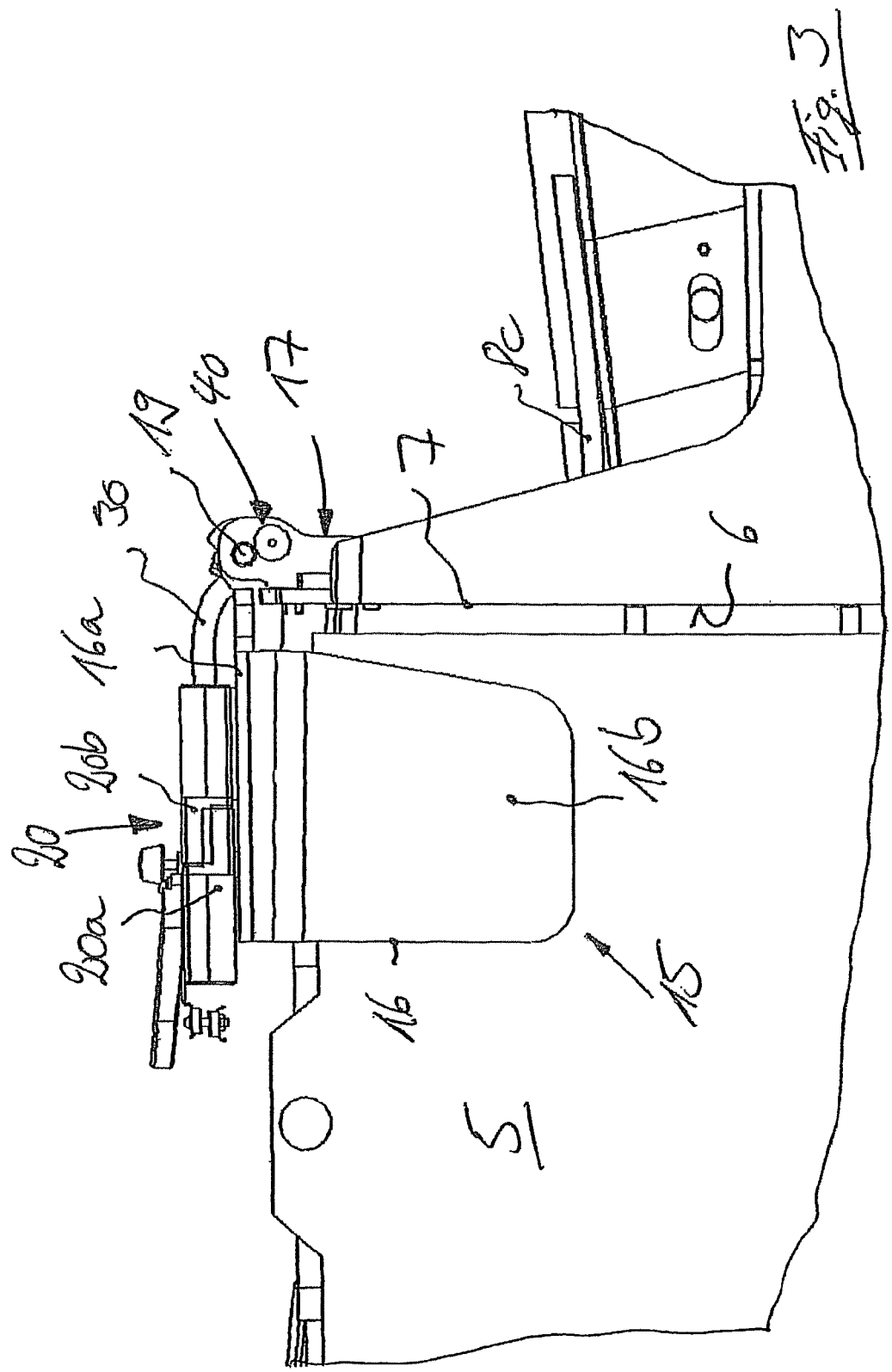
FIG. 3 shows a retaining apparatus in the retaining position in a side view.
Figure 4:
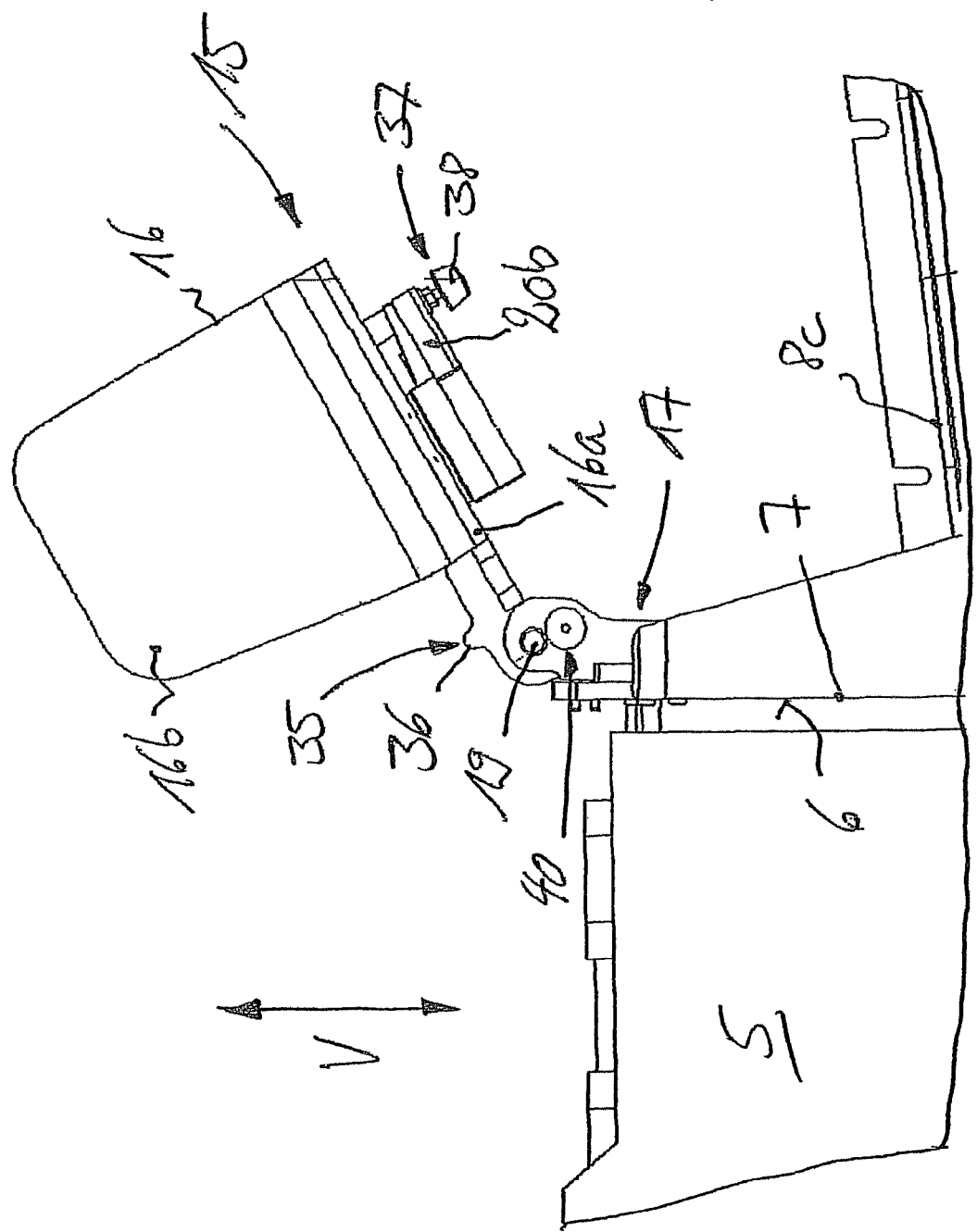
FIG. 4 shows a retaining apparatus in the removal position in a side view.

The retaining apparatus 15 can be pivoted between a retaining position illustrated in FIGS. 2 and 3 in which the bearing segment 16a is oriented essentially horizontally and is located above the energy supply unit 5, and the retaining segment 16b interacts with the side wall of the energy supply unit 5, and a removal position illustrated in FIG. 4. In the retaining position, the vehicle-side coupling element 20b is therefore located above the energy supply unit 5 so that the contacting apparatus 20 can be ergonomically efficiently connected and disconnected. In the removal position, the retaining apparatus 15 is pivoted so that the bearing segment 16a and the retaining segment 16b are in front of the forward transverse wall 7, so that the retaining apparatus 15 is located outside the range of motion of the energy supply unit 5. The energy supply unit 5 can therefore be extracted from the compartment or inserted into the compartment in the horizontal direction H or upward in the vertical direction V.

Figure 5:
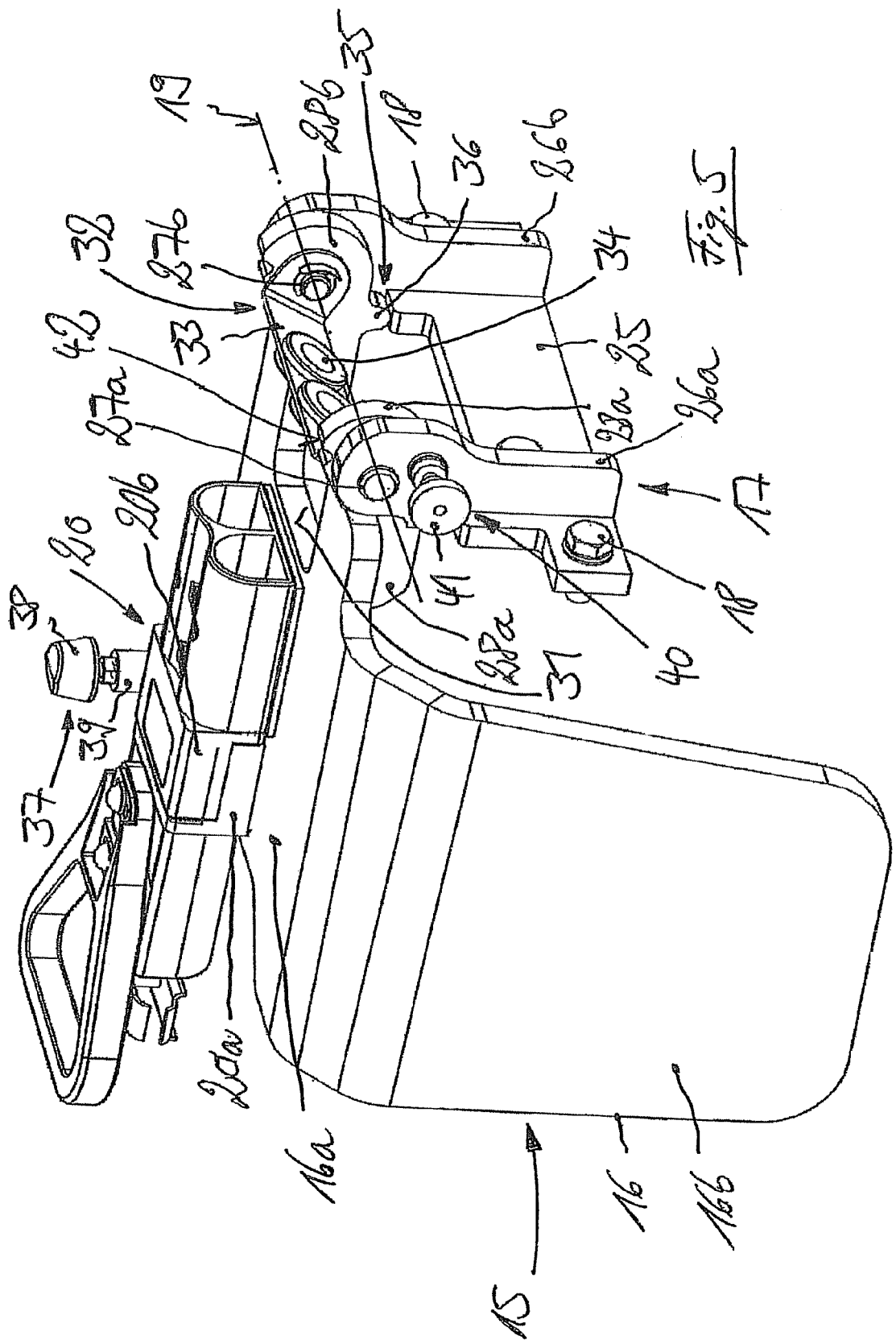
FIG. 5 shows a retaining apparatus in the retaining position in a perspective view.

FIGS. 5 and 6 show the construction of the retaining apparatus 15 in greater detail. FIG. 5 shows the retaining apparatus 15 in the retaining position and FIG. 6 shows the retaining apparatus 15 in the removal position.

The bearing housing 17 includes a base plate 25 which can be fastened to the forward transverse wall 7 by the threaded fasteners 18. Located on the base plate 25 are two plate-shaped bearing components 26a, 26b which are separated from each other by some lateral distance. The bearing segment 16a of the bent retaining plate 16 is provided in the vicinity of each bearing component 26a, 26b with a corresponding flange plate 28a, 28b. Between the bearing components 26a, 26b and the flange plates 28a, 28b, there are respective pivot bearings 27a, 27b formed by a bearing pin.

The electrical connection cables 30 connected with the vehicle-side coupling element 20b, as shown in FIG. 2, are located between the flange plates 28a, 28b and the bearing components 26a, 26b in the vicinity of the pivoting axis 19 and are guided along the vertical transverse wall 7.

For this purpose, the bearing segment 16a is provided between the flange plates 28a, 28b with a U-shaped recess 31 that faces the vehicle-side coupling element 20b and a guide apparatus 32 for the electrical connection cables 30 located between the flange plates 28a, 28b. The guide apparatus 32 includes a U-shaped yoke 33, which is rotationally mounted on the bearing pins of the pivot bearings 27a, 27b, and is provided with cable retaining devices 34 for the electrical connection cables 30. The electrical connection cables 30, which are routed from the vertical transverse wall 7 to the vehicle-side coupling element 20b through the pivoting axis 19, are easily protected by the retaining device 34 during the swiveling of the retaining apparatus 15 against kinking and damage.

In the retaining position illustrated in FIG. 5, the retaining apparatus 15 is supported with a support 35. In the illustrated embodiment, the support 35 is formed by locking lugs 36 which are located on each of the flange plates 28a 29a, which in the retaining position are in a functional connection with the upper side of the base plate 25, so that the retaining apparatus 15 is fixed in the retaining position and is supported on the vertical transverse wall 7. As a result of which, the retaining apparatus 15 can absorb high forces.

Also located on the retaining apparatus 15 is a support element 37, with which, in the retaining position, the retaining apparatus 15 is in a functional connection with the closed hood 10. The support element 37 is formed by a spring and/or damper element 38 which is located on the bearing segment 16a. The spring and/or damper element 38 is located on a retaining pin 39 fastened to the bearing segment 16a, and can be vertically adjusted in the latter. With the support element 37, during the operation of the industrial truck, therefore, the retaining apparatus 15 can be easily held in the retaining position by the closed hood 10.

The retaining apparatus 15 can also be interlocked in the removal position illustrated in FIG. 6, first by the force of gravity and additionally by an interlocking device 40. The interlocking device 40 can be formed, for example, by a locking pin 41, such as a spring-loaded locking pin located on the bearing component 26a and which can be brought into interaction with the corresponding recess on the associated flange plate 28a in the removal position of the retaining apparatus 15, and the retaining apparatus 15 is thereby locked in the removal position.

On the industrial truck 1, after the opening of the hood 10, the contacting apparatus 20 which is located above the energy supply unit 5 can be disconnected ergonomically and then the retaining device 15 can be pivoted out of the retaining position into the removal position, in which it is held by the interlocking device 40. Consequently, the retaining apparatus 15 and the vehicle-side coupling element 20b of the contacting device 20 can be brought out of the range of movement of the energy supply unit 5 with only one manual intervention, so that the energy supply unit 5 can be moved out of the compartment laterally in the horizontal direction H or upwardly in the vertical direction V.

After the insertion of a new energy supply unit 5 into the compartment, the interlock device 40 can be released by pulling on the locking pin 41 and pivoting the retaining apparatus 15 into the retaining position, in which the contacting device 20 can be connected.

The retaining apparatus 15 has a high degree of operational safety and reliability and a low risk of operator error because the contacting device 20 can be connected and disconnected only when the retaining apparatus 15 is in the retaining position.

In addition, in the removal position of the retaining apparatus 15, a closing of the hood 10 is prevented by the retaining segment 16b which projects vertically upwardly. This measure ensures that during operation of the industrial truck, the retaining apparatus 15 is in the retaining position in which the energy supply device 5 is secured in the lateral direction by the vertical retaining segment 16b of the retaining apparatus 15. Moreover, as a result of the location of the vehicle-side coupling element 20b on the bearing segment 16a, the retaining apparatus 15 effectively prevents damage to the coupling element 20 both in the retaining position as well as in the removal position, for example, from damage caused by the unintentional closing of the hood.

The retaining apparatus 15 is located completely inside the vehicle contour both in the retaining position as well as in the removal position, so that damage to the retaining apparatus 15 during the operation of the industrial truck can be effectively prevented.

The retaining apparatus 15, on account of the vertical retaining segment 16b and its vertical extension, can be used for energy supply units 5 with different heights. The retaining apparatus 15 is also suitable for use with different types of energy supply units 5, for example, battery blocks with different battery tray configurations. To secure energy supply units 5 of different widths and lengths in the lateral direction in the compartment by the retaining apparatus 15, different stops can easily be used in the vicinity of the side wall of the chassis 2 opposite the lateral opening 6.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An industrial truck, comprising:
a compartment for an energy supply unit, the compartment having a lateral opening for changing or replacement of the energy supply unit;
a retaining apparatus for fixing the energy supply unit in position in a lateral direction; and
a contacting apparatus for electrical connection of the energy supply unit with the industrial truck,
wherein the retaining apparatus is located so that it pivots between a retaining position and a removal position on the industrial truck,
wherein a vehicle-side coupling element of the contacting apparatus is located on the retaining apparatus such that in the retaining position of the retaining apparatus, the vehicle-side coupling element is located above the energy supply unit and in the removal position for change or replacement of the energy supply unit the retaining apparatus with the vehicle-side coupling element is outside a range of movement of the energy supply unit,
wherein the retaining apparatus includes a retaining plate which is bent at an angle and has a bearing segment pivotably mounted on a bearing housing, and has a vertical retaining segment oriented substantially perpendicular to the bearing segment, wherein the vehicle-side coupling element is located on the bearing segment.

2. The industrial truck as recited in claim 1, wherein the bearing housing has two bearing components at a lateral distance from each other, wherein the bearing segment of the retaining apparatus is provided in the area of each bearing plate with a flange segment and wherein a pivot bearing is located between each bearing plate and respective flange segment.

3. The industrial truck as recited in claim 2, wherein at least one electrical connection cable that leads to the vehicle-side coupling element is located between the flange plates and/or the bearing components.

4. The industrial truck as recited in claim 2, wherein the bearing segment of the retaining apparatus is provided with a recess between the flange plates.

5. The industrial truck as recited in claim 3, wherein a guide device for the electrical connection cable is located between the flange plates and/or the bearing components.

6. The industrial truck as recited in claim 5, wherein the guide device is formed by a yoke which is rotationally located on the pivot bearings of the retaining apparatus and is provided with a cable holding device for the electrical connection cable.

7. The industrial truck as recited in claim 1, including at least one support provided on the retaining apparatus with which the retaining apparatus is supported in the retaining position.

8. The industrial truck as recited in claim 7, wherein the support is formed by a locking lug provided on a flange plate.

9. The industrial truck as recited in claim 1, wherein the retaining apparatus is provided with an interlocking device for the removal position.

10. The industrial truck as recited in claim 9, wherein the interlocking device is formed by a locking pin.

11. The industrial truck as recited in claim 10, wherein the locking pin is located on a bearing component of a bearing housing and is brought into a functional connection with a recess of the flange plate pivotably located on a bearing component.

12. The industrial truck as recited in claim 1, wherein the retaining apparatus is located in the retaining position underneath a hood that covers the compartment of the energy supply unit, which hood is mounted so that it pivots on the industrial truck, and wherein located on the retaining apparatus is a support element which, in the retaining position, is in a functional connection with the hood.

13. The industrial truck as recited in claim 12, wherein the support element is formed by a spring and/or damping element located on a bearing segment.

14. The industrial truck as recited in claim 12, wherein in that in the removal position, the retaining apparatus prevents the closing of the hood, in particular by means of a retaining segment.

15. The industrial truck as recited in claim 12, wherein the pivoting movement of the retaining apparatus is coupled with the movement of the hood.

16. The industrial truck as recited in claim 1, wherein the retaining apparatus is located on a forward vertical transverse wall of the industrial truck which forms a boundary of the compartment.

17. The industrial truck as recited in claim 1, wherein the bearing housing is detachably fastened to a forward transverse wall of the industrial truck by at least one threaded fastener.

18. The industrial truck as recited in claim 3, wherein the electrical connection cable that is guided to the vehicle-side coupling element is laid along a vertical transverse wall.

* * * * *

UNITED STATES PATENT AND TRADEMARK OFFICE
CERTIFICATE OF CORRECTION

PATENT NO. : 8,196,690 B2  
APPLICATION NO. : 12/499818  
DATED : June 12, 2012  
INVENTOR(S) : Joachim Kunkel et al.

Page 1 of 1

It is certified that error appears in the above-identified patent and that said Letters Patent is hereby corrected as shown below:

Column 8, Line 39, Claim 2, delete "plate" and insert -- segment --

Column 8, Line 39, Claim 2, "flange segment" should read -- flange plate --

Column 8, Line 40, delete "plate" and insert -- segment --

Column 8, Line 41, Claim 2, "flange segment" should read -- flange plate --

Column 9, Lines 16-17, Claim 14, after "wherein" delete "in that"

Signed and Sealed this
Second Day of October, 2012

David J. Kappos
*Director of the United States Patent and Trademark Office*